(No Model.)
S. WHITTIER.
SPOOL HOLDER FOR SEWING MACHINES.
No. 471,366. Patented Mar. 22, 1892.
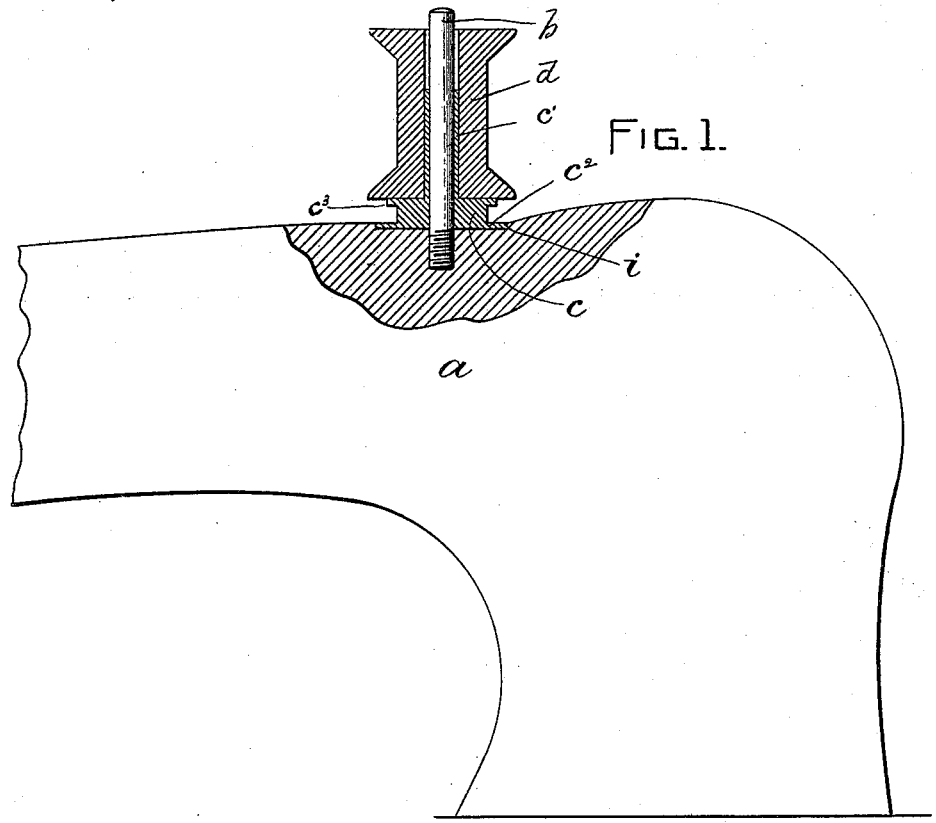
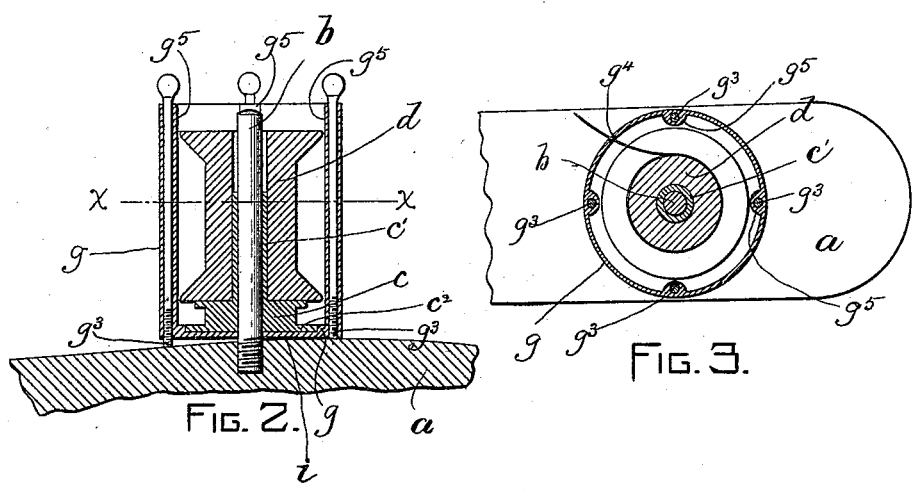
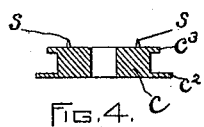
WITNESSES:
INVENTOR:
S. Whittier

UNITED STATES PATENT OFFICE.

SAMUEL WHITTIER, OF LEOMINSTER, MASSACHUSETTS.

SPOOL-HOLDER FOR SEWING-MACHINES.

SPECIFICATION forming part of Letters Patent No. 471,366, dated March 22, 1892.

Application filed August 5, 1891. Serial No. 401,800. (No model.)

*To all whom it may concern:*

Be it known that I, SAMUEL WHITTIER, of Leominster, in the county of Worcester and State of Massachusetts, have invented certain new and useful Improvements in Spool-Holders for Sewing-Machines, of which the following is a specification.

This invention has for its object to prevent the loose coils of thread that drop from the periphery of a spool mounted on the pin or spindle attached to the arm of a sewing-machine from being caught between said arm and the base or lower head of the spool.

The invention consists, first, in a collar adapted to rotate on the spindle and to be engaged with the spool, so as to extend below the lower end thereof, in combination with a recessed seat formed to receive the lower end of said collar and prevent coils of thread that drop from the spool from being caught by the fixed spindle.

The invention also consists in a casing adapted to surround the spool and the spindle on which it rotates and to receive the said collar, the bottom of said casing having a recessed seat which receives the lower portion of the collar.

In the accompanying drawings, forming a part of this specification, Figure 1 represents a side elevation, partly in section, of a portion of the arm of a sewing-machine and a sectional view of the spool and the disk or collar constructed in accordance with my invention. Fig. 2 represents a similar view showing the spool-receiving box or casing. Fig. 3 represents a section on line $x\ x$ of Fig. 2. Fig. 4 represents a sectional view of the flanged disk or collar, showing a different device for engaging it with the spool.

The same letters of reference indicate the same parts in all of the figures.

In the drawings, $a$ represents the arm of a sewing-machine, and $b$ represents a spindle affixed to said arm and formed to pass through the bore of a spool $d$.

$c$ represents a collar, which is shown as a disk which has a central orifice formed to receive the spindle $b$ and to permit the collar to rotate freely on said spindle.

Referring to Figs. 1, 2, and 3, $c'$ represents a sleeve formed on the collar $c$ and adapted to enter the bore of the spool, the interior of said sleeve constituting a continuation of a spindle-receiving orifice in the collar. The lower edge of the collar $c$ is provided with an outwardly-projecting flange $c^2$, which may be of any desired width and thickness.

$c^3$ represents a narrower flange at the upper edge of the collar, the object of said flange being to prevent coils of thread that may drop onto the flange $c^2$ from being drawn between the lower end of the spool and the upper surface of the collar $c$. The sleeve $c'$, which rotates loosely on the spindle $b$, provides that in case the coils of thread should not be held on the collar by the upper flange $c^3$ said coils cannot come in contact with and be entangled by the fixed spindle $b$, but will be unwound by the rotation of the collar and sleeve and spool.

The flange $c^2$ is contained in a recessed seat $i$, formed to receive it and to cover its under side and its margin. Said seat $i$ is shown in Fig. 1 as formed in the upper portion of the arm $a$, its diameter and depth being such that it is in close proximity to the margin of the flange $c^2$ and covers said margin or the greater part thereof, so that there is no possibility of a loose coil of thread entering the crevice between the under side of the collar $c$ and the support upon which said collar rests.

The construction shown in Fig. 1 is preferable when my improvement is applied to new sewing-machines, so that it is practicable to form the seat $i$ directly in the arm of the machine.

To enable my improvement to be applied to machines not provided with the seat $i$, I provide the device shown in Figs. 2 and 3, which includes a box or casing $g$, formed to receive the spool and having in its bottom the recessed seat $i$, that receives the flange $c^2$ on the lower edge of the collar $c$. Said box $g$ is open at its upper end, and its bottom is provided with an orifice to receive the spindle $b$.

$g^3\ g^3$ represent a series of legs, which are adjustably secured to the box $g$, and are screw-threaded to engage with internal threads formed in sockets $g^5$, formed on said box. Said legs by their adjustability are enabled to bear on the curved surface of the arm and to support the box in an upright position thereon, as will be seen by reference to Fig. 2. The box is provided with a vertical slot $g^4$, which permits the passage of the thread from the spool through the walls of the box. It will be seen that in either case the thread is prevented from being caught between a fixed and a moving surface, so that there is no liability of the thread being caught and broken by the pull exerted on it by the needle.

I do not limit myself to the sleeve $c'$ as the means for engaging the collar $c$ with the spool. In Fig. 4 I show said collar provided with spurs $s$ $s$ on its upper surface, adapted to penetrate the lower end of the spool for the same purpose.

I claim—

1. A cylindrical collar $c$, having a central orifice to receive the spool-holding spindle of a sewing-machine and presenting a flat thread-supporting surface below the spool-head, combined with a recessed seat $i$, the margin of which covers the margin of said surface, whereby the admission of thread between the under side of the collar and its seat is prevented, as set forth.

2. A collar $c$, having means for engagement with a spool and a central orifice to receive the spool-holding spindle, said collar having a flange or thread-supporting surface below the spool-head, combined with a box or casing having in its bottom a recessed seat formed to cover the margin of said flange and provided with a thread-delivering slot in its periphery and a spindle-receiving orifice in its bottom, as set forth.

In testimony whereof I have signed my name to this specification, in the presence of two subscribing witnesses, this 20th day of July, A. D. 1891.

SAMUEL WHITTIER.

Witnesses:
CHAUNCEY W. CARTER,
R. L. CARTER.